United States Patent Office 2,971,940
Patented Feb. 14, 1961

2,971,940
NICKEL PHENOLATE STABILIZED POLYPROPYLENE

Charles H. Fuchsman, Cleveland Heights, Albright M. Nicholson, Warrensville Heights, and Stanley B. Elliott, Bedford, Ohio, assignors to Ferro Corporation, Cleveland, Ohio, a corporation of Ohio
No Drawing. Filed Mar. 20, 1959, Ser. No. 800,629
8 Claims. (Cl. 260—45.75)

This invention relates to stabilized crystalline polypropylene compositions, and more particularly to crystalline polypropylenes which have been stabilized with nickel phenolates hereinafter more particularly described.

The inertness of crystalline polypropylenes under a variety of conditions has resulted in increasingly widespread use in diverse fields of application. One of the factors which limits present usefulness in outdoor applications is the tendency to deteriorate under the influence of the ultraviolet light present in sunlight. This deterioration is detectable in a number of ways, chief of which is an increase in brittleness and a decrease in elongation under tensile stress. These changes in the original characteristics of the polypropylene cause sheets or fibers of such materials when exposed to weather to break and tear readily. Utilization of these materials in sheet or fiber form, in covering greenhouses, draping open areas in building construction, etc. is consequently much reduced.

Attempts have been made to use various additives for the prevention of ultraviolet light deterioration of crystalline polypropylenes. Thus, the addition of carbon black alone or with antioxidants reduces light deterioration. However, the resulting product is opaque to visible light and thus of limited utility. Other attempts to meet this problem have included admixture of various commercially available ultraviolet absorbers with the polypropylene. Some substituted benzophenones which are excellent ultraviolet light absorbers are very difficult to retain in admixture with polypropylene. These materials have, however, conferred insufficient light stability, or have proved largely incompatible with polypropylenes, and have migrated to the surface of the plastics where they are readily removed by rain and wind-borne abrasive dusts. Any unremoved efflorescence is unsightly and opaque.

It is a principal object of this invention, therefore, to provide improved crystalline polypropylene compositions better able to withstand the deleterious effects of prolonged exposure to ultraviolet light sources.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that certain bis-(p-alkylphenol) monosulphides, in which part or all of the phenolic hydrogen atoms have been replaced by nickel possess important light stabilization characteristics when used as additives in crystalline polypropylenes. Broadly stated, therefore, this invention comprises crystalline polypropylene containing in intimate admixture therewith from about 0.05% to about 5% by weight of a nickel phenolate of o,o'-bis-(p-alkylphenol) monosulphide in which the alkyl group contains from 2 to 12 carbon atoms.

The term "stabilized" and the various forms of the word used herein has reference to improvement in the ability of the treated material upon prolonged exposure to a destructive force to retain certain of its original characteristics. Thus, in the present case, there is an improvement in the ability of crystalline polypropylene compositions upon prolonged exposure to the destructive forces of ultraviolet light to retain flexibility and stretchability (elongation) in useful degrees. In the absence of the stabilizers of this invention, crystalline polypropylenes, upon exposure to ultraviolet light, such as present in sunlight, rapidly become brittle and sheets thereof break or tear readily.

The term "phenolate" as used herein is used in the generic sense, i.e., as identifying a compound characterized by the presence therein of the M—O—Q—group where M is the hydrogen equivalent of nickel and Q is an aromatic ring, a carbon atom of which is linked to the metal through the oxygen atom. The term "phenol-phenolate," not in common usage, will be understood as a phenolate compound containing more than one phenolic group, in which some, but not all of the phenolic hydrogens have been replaced by nickel. "Full phenolate" as used herein refers to a phenolate compound derived from a phenolic compound containing more than one phenolic group in which all the phenolic hydrogen atoms have been replaced by the hydrogen equivalent of nickel.

The class of polypropylenes to which the present invention is primarily directed and in which stabilization against the deleterious effects of ultraviolet light exposure is achieved, is characterized as follows: The contemplated polymers have crystalline structure as determined by X-ray analysis; a number average molecular weight range of from about 45,000 to 100,000 and higher; a melting point in the range of from about 140° C. to about 170° C. when measured by a birefringence method, reduced specific viscosities (RSV) of about 1 to about 9, and densities of 0.87 to 0.93. By the term "reduced viscosity" is meant the $\eta$ sp./c. determined on a solution of 0.1 g. of the polymer in 100 g. of decalin at 135° C.

Crystalline polypropylenes having the foregoing characteristics may be prepared by any of the well-known processes of polymerizing propylene to a crystalline or isotactic polymer, as for example by the processes described in Belgian Patents 530,617; 538,782; 543,259; 546,846, etc.

By one such method, crystalline polypropylenes having the foregoing characteristics are separated from a liquid phase bulk polymerization reaction mass. In general, polymerization is effected in the presence of certain metal-containing catalysts where the metal is of the 4th or 6th group of the periodic system. The reaction pressure ranges from atmospheric to as high as 30 atmospheres, and the temperature ranges between 20° C. and 150° C. Solvent or diluent may be present, or the liquid monomer may be the only material present in addition to the catalyst. The reaction is conducted in the absence of oxygen and water. Various fractions of polymerized mass are separated by special sequential solvent treatment. For complete details, reference may be had to the patent of Natta and Ziegler, Belgian Patent 538,782 for the preparation of crystalline polypropylene compositions in which stabilization against degradation by ultraviolet light is secured in accordance herewith. Other methods of producing crystalline polypropylenes may, of course, be employed. The polymers in the commercial form usually have other ingredients present in small amounts, e.g. heat stabilizers, and antioxidants.

Crystalline polypropylenes are unique among polyolefins in possessing physical and chemical properties and behavior characteristics not common to other crystalline polyalkylenes. For example, it is a general rule that as the carbon content of the monomer from which the crystalline polymer is made increases, the temperature of transition from the crystalline to the amorphous state decreases. However, the transition temperature for crystalline polypropylene is higher than that for crystalline polyethylene or crystalline polybutylene.

In further distinction from substantially unbranched polyalkylenes every other carbon atom in the main carbon chain of this crystalline polypropylene polymer is tertiary. Such carbon atoms are particularly susceptible to attack by ultraviolet light and by oxygen. Thus, crystalline polypropylene is qualitatively distinguishable in its susceptibility to deterioration from other polyalkylenes not characterized by a high proportion of tertiary carbon atoms.

Inclusion of additives in highly crystalline polymeric materials poses problems, primary among which is the tendency of many additives to exude to the turface of the polymer. Certain substituted benzophenones which are excellent ultraviolet light absorbers are very difficult to retain in admixture with highly crystalline polypropylene.

A primary advantage of the nickel phenolates of the present invention, whether the full phenolate or a nickel phenol-phenolate, is their ability to confer stabilization and remain in compatible relationship with the crystalline polypropylene and other additives, e.g. antioxidants and/or heat stabilizers normally incorporated in minor amounts, e.g. less than 1% by weight, in commercially available crystalline polypropylenes.

Another of the primary advantages of the nickel phenolates of the present invention and especially nickel phenolates derived from crystalline o,o'-bis-(p-alkylphenol) monosulphides, e.g. crystalline o,o'-bis-(p-1,1,3,3-tetramethylbutylphenol) monosulphide, is that in the minor amounts effective to stabilize crystalline polypropylene compositions, the coloration imparted to the plastics by the additive is not objectionable. Effective stabilization without substantial coloration has been long sought for polypropylene compositions. Thus, in applications, such as, the covering of greenhouses and structural openings, the normal light transmission of the plastic material is not greatly altered by the inclusion of the nickel phenolates hereof.

The improved stabilized compositions of the present invention are best made from a crystalline polypropylene composition to which has been added by conventional procedures, a nickel phenolate prepared from a crystalline o,o'-bis-(p-alkylphenol) monosulphide. Of particular utility in this respect are nickel phenol-phenolates and full phenolates derived from crystalline o,o'-bis-(p-1,1,3,3-tetramethylbutylphenol) monosulphide. The nickel derivatives thereof are fully described in the following examples and also in the application of Nicholson and Zaremsky, Serial No. 789,908, filed January 9, 1959, to which reference may be had.

Briefly, the nickel-phenol-phenolates may be obtained by a metathetic reaction between the sodium phenol-phenolates of the bis-(p-alkylphenol) monosulphide and a nickel halide in an anhydrous medium and have the probable structure of Formula I.

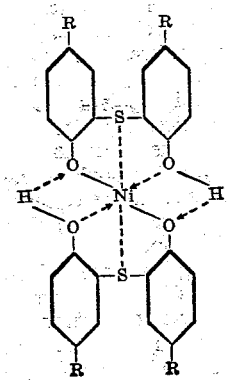

Formula I

Alternatively, the nickel phenol-phenolates may be obtained by direct reaction of a hydrated nickel salt of a weak acid, e.g. hydrated nickel acetate to yield a product having the probable structure of Formula II.

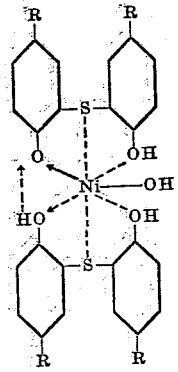

Formula II

In the above Formulae I and II, R is an alkyl group of from 2 to 12 carbon atoms. The dotted lines of the foregoing formulae represent interatomic linkages of the chelate type and simple hydrogen bonding in the case of the free phenolic group. The lines bearing arrows represent interchangeable linkages which suggest the equivalence of the two bis-(p-alkylphenol) monosulphide units in their relationship to the nickel atom.

The full phenolates of the present invention are produced by similar reactions using correspondingly increased amounts of reactants to yield products of the general formula III below:

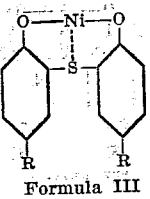

Formula III

A method of preparing a phenol monosulphide of good quality is illustrated in the preparation of one crystalline o,o'-bis-(p-octylphenol) monosulphide. By other procedures well known in the art (see Mikeska et al. 2,139,321), o,o'-bis-(p-tert.-butylphenol) monosulphide, o,o'-bis-(p-tert.-amylphenol) monosulphide, o,o'-bis-(p-2-ethylhexylphenol) monosulphide, o,o'-bis-(p-nonylphenol) monosulphide, o,o'-bis-(p-laurylphenol) monosulphide may also be prepared, as well as any of the other o,o'-bis-(p-alkylphenol) monosulphides in which the alkyl group contains from 2 to 12 carbon atoms, in branched or linear relationship, useful herein may be prepared. Various polymeric by-products are often formed simultaneously with the desired bis-(p-alkylphenol) monosulphide. Since the nickel derivative of such polymeric material tends to be objectionably dark even at 50% displacement of H atoms by Ni, it is usually necessary to effect a separation between the by-product polymer sulphide and the bis-(p-alkylphenol) monosulphide prior to the production of the Ni salt. This separation is accomplished with varying measures of ease or difficulty depending on the nature of the alkyl substitution on the ring. The example given below illustrates where such separation is based on differential solubility between the product and by-product in a commercially available mixture of aliphatic hydrocarbons.

EXAMPLE 1

A solution of p-1,1,3,3-tetramethylbutylphenol (200 grams) in $CCl_4$ (640 grams) is prepared at room temperature and then cooled to 45° F. with strong agitation. At this temperature the p-1,1,3,3-tetramethylbutylphenol tends to come out of solution, but this is of little concern as long as the mixture is kept under agitation. 50 grams of SCl₂ admixed and in solution with 50 grams of CCl₄ are added over a period of about 1 hour, and the mixture allowed to agitate for an hour after the addition has ceased. After overnight standing, the mixture is washed with water to extract HCl, cooled and diluted with 200 grams of petroleum ether (B.P. 30°–60° C.). The more highly sulphurized product is soluble in the petroleum ether. However, the o,o'-bis-(p-1,1,3,3-tetramethylbutylphenol) monosulphide separates out as a crystalline white solid which is easily filtered. This is an example of an o,o'-bis-(p-octylphenol) monosulphide.

Alternatively, high vacuum distillation may be employed to separate out desired bis-(p-alkylphenol) monosulphides from reaction masses.

As indicated above, the nickel salts may be prepared by two basically different methods; metathesis and direct reaction.

EXAMPLE 2

The nickel-phenolate, that is, the fully substituted bis-(p-alkylphenol) monosulphide illustrated in Formula III above was prepared as follows:

o,o'-Bis-(p-1,1,3,3 - tetramethylbutylphenol) monosulphide obtained from the above reaction was converted into the full sodium phenolate by reaction at room temperature with a stoichiometric amount of sodium ethoxide in absolute ethanol (20% solution) followed by reaction with a stoichiometric quantity of NiCl₂ in absolute alcohol. Sodium chloride is precipitated and filtered off. On evaporation of the alcohol, a yellowish brown, crystalline solid is obtained which corresponds to the formula given above as Formula III. The analytical results were: theoretical nickel 11.75%, sulphur 6.62%, found nickel 10.05%, sulphur 6.52%.

EXAMPLE 3

To produce the nickel phenol-phenolate, a procedure identical with that given in Example 2 except that only one-half of the stoichiometric amount of sodium ethoxide required to react with all the phenolic hydroxyl was used. The amount of nickel chloride added was then stoichiometrically equivalent to the reduced amount of sodium. The final product in this case was a light green crystalline product corresponding essentially to the formula of the type given in Formula I. This product had a nickel content of 5.5% found as against a theoretical percentage of 6.2%. The deficiency in nickel was attributed to the presence of unreacted bis-(octylphenol) sulphide.

EXAMPLE 4

To produce the nickel phenol-phenolate particularly useful in accordance with this invention, a quantity of nickel acetate tetrahydrate dissolved in xylene (1:1) and equivalent to half the number of phenolic OH groups in the sulphurized phenol is heated with a 40% solution of o,o'-bis-(p-1,1,3,3-tetramethylbutylphenol) monosulphide in xylene at or slightly below the boiling point of acetic acid. With continued heating the latter is distilled off almost quantitatively. The xylene solution is filtered to remove any xylene-insoluble impurities which may have formed during the reaction. The filtrate is evaporated to remove all the xylene. The residual liquid may be cooled by any of several procedures to yield the solid product. The product is hard and friable and contains 6.1% Ni (theoretical 6.1% Ni).

EXAMPLE 5

A solution of p-tert-amylphenol (125 grams, melting point 94.5–95.0° C.) in ethylene dichloride (630 grams) was heated to boiling under reflux and a solution of sulfur dichloride (40 grams) in ethylene dichloride (120 grams) was added slowly, with agitation, the hydrogen chloride gas evolved during the reaction was removed through the reflux condenser. After the addition of the sulfur dichloride solution was complete, the reaction mixture was heated under reflux until no further emission of hydrogen chloride was detected, about 6 hours. The reaction mixture was then heated, finally under a vacuum of 0.15 mm. to 100° C., to remove the solvent and some unreacted p-tert-amylphenol (8.4 grams). By this procedure there remained 130 grams of a light brown syrup. A portion of this reaction mixture (9.28 grams) was distilled and the following fractions were taken:

Forerun _____ To 181° C./0/13 mm., 1.30 g.
Fraction 1 _____ 181–182° C./0/13 mm., 1.62 g.
Fraction 2 _____ 182° C./0/13 mm., 1.48 g.
Fraction 3 _____ 181–185° C./0/13 mm., 2.64 g.

On standing overnight fractions 1, 2 and 3 crystallized. The crystals were separated and recrystallized twice from hexane. Fractions 1 and 3 combined yielded 2.76 grams of bis-(p-tert-amylphenol) monosulfide having a melting point of 99.5–100.5° C. Two recrystallizations of fraction 2 yielded 1.10 grams of bis-(p-tert-amylphenol) monosulfide having a melting point of 100.0–101.0° C. The analytical results on this product were: theoretical, carbon 73.70, hydrogen 8.44; found, carbon 73.75; hydrogen 8.53.

To a solution of sodium (0.46 gram) in anhydrous ethanol (50 grams) was added 3.58 grams of the above bis-(p-tert-amylphenol) monosulfide. After the solution was complete, a solution of nickel chloride hexahydrate (2.38 grams) in anhydrous ethanol (50 grams) was added. The reaction mixture was stirred 15 minutes, hexane (100 grams) was added, and the reaction mixture was then heated under reflux for 45 minutes. The sodium chloride that had formed was removed by filtration and washed with a small amount of benzene. The filtrate and benzene washings were combined and the diluents were removed by distillation. The residue was dissolved in hexane and the solution filtered, after which 95% ethanol was added to the filtrate and the hexane was removed by distillation. On cooling to room temperature the nickel phenol-phenolate of the o,o'-bis-(p-tert-amylphenol) monosulfide crystallized in the form of green crystals. This crystalline product was separated and dried at 20° C. in vacuo for 16 hours. It did not melt below 360° C. The analytical results on this product were: theoretical, nickel 14.1%, carbon 63.6%, hydrogen 6.8%; found, nickel (by direct ash) 16.9%, carbon 57.45%, hydrogen 6.86%.

EXAMPLE 6

A commercial sample of crystalline polypropylene was mixed with a carefully prepared sample of the nickel phenolphenolate of o,o'-bis-(p-1,1,3,3-tetramethylbutylphenol) monosulphide produced in accordance with Example 4 above. The nickel compound constituted 0.5% of the mixture. The mixture was pressed at 450° F. for 15 minutes to yield a clear very light green sheet. Samples of this sheet, together with control sheets containing no additive were then exposed to intense ultraviolet light. Every 24 hours the samples were tested by bending sharply through 180°. Cracking along the bend was regarded as failure. The control samples failed between 72 and 96 hours. The samples containing the additive had not failed after 390 hours.

The nickel phenol-phenolate of o,o'-bis-(p-1,1,3,3-tetramethylbutylphenol) monosulphide produced in accordance with the procedure of Example 4 above was solvent slurry blended with commercial samples of crystalline polypropylene having a density of 0.90 and a crystalline melting point of 167.2° C. (birefringence) and a specific viscosity of 0.127. Plaques of both stabilized and control (nickel phenol-phenolate free) sample 5 mm. thick were pressed under 2000 p.s.i. pressure at 215° C. for 15 minutes and tested by exposure to ultraviolet light in a Fade-Ometer. The results in Table I were noted for indicated concentrations in crystalline polypropylene samples.

Table I

| Commercial polypropylene Sample [1] | Percent Concentration Nickel Phenol-Phenolate | Color | Fade-Ometer Life (hrs.) |
|---|---|---|---|
| A | 0.0 | Clear | 84 |
| A | 0.1 | do | 132 |
| A | 0.25 | do | 220 |
| A | 0.5 | V. lt. green | 370 |
| B | 0.0 | clear | 144 |
| B | 0.25 | do | 330 |
| B | 0.5 | V. lt. green | 390 |
| C | 0.0 | clear | 132 |
| C | 0.25 | do | 194 |
| C | 0.5 | V. lt. green | 330 |

[1] Samples A, B and C are different lots of commercial polypropylene.

The nickel phenol-phenolate of o,o'-bis-(p-tert-amylphenol) monosulfide prepared in Example 5 was solvent slurry blended with a crystalline polypropylene having an RSV of 4.3. Plaques of the so-stabilized polypropylene and a control containing no stabilizers 5 mm. thick were pressed under 200 p.s.i. pressure at 215° C. for 15 minutes and tested by exposure to ultraviolet light in a Fade-Ometer. The control containing no stabilizer failed in less than 24 hours. The polypropylene plaque containing 0.5% of the nickel phenol-phenolate of o,o'-bis-(p-tert-amylphenol) monosulfide was a very light green and had not failed after 168 hours.

Another procedure for incorporating the stabilizers is as follows: finely-divided stabilizer is intensively mixed dry with fine polypropylene powder, then extruded into molding powder.

In like manner crystalline polypropylene compositions containing other nickel phenolates, either full nickel phenolates, or nickel phenol-phenolates, of the o,o'-bis-(p-alkylphenol) monosulphides maye be prepared.

In general the stabilizers of the present invention are effective over a much broader range of concentration, namely, 0.05% to about 5%. The lower limit of this range, is a threshold limit. Coloration imparted to the polypropylene by the stabilizers hereof is negligible at concentrations which are optimum, e.g. 0.1 to 1.0%. While there appears to be continued improvement in ultraviolet stabilization at concentrations above 1%, that is, up to 5% by weight and intermediate quantities, after amounts of about 1% by weight have been added to the crystalline polypropylene compositions, the amount of improvement in flexibility and elongation after 150 hours' exposure to intense ultraviolet light does not appear to justify the added cost of the stabilizer. Moreover, coloration is increased at the higher concentrations above 1% although still within acceptable ranges for many purposes.

It has been found that variations in the structure, carbon content and location of the alkyl substituents is permissible without destroying the desirable characteristics of the phenol-phenolate or phenolate product. There cannot be a sterically hindering substituent in the ortho position of the phenol which is effective to prevent metal substitution. Thus, in addition to the various full phenolates and phenol-phenolates above-mentioned, the nickel phenol-phenolates of o,o'-bis-(p-tertiary amylphenol) monosulphide, the nickel phenol-phenolate of o,o'-bis-(p-ethylphenol) monosulphide, the nickel phenol-phenolate of o,o'-bis-(p-2-ethylhexyl-phenol) monosulphide, the nickel phenol-phenolate of o,o'-bis-(p-tertiary butylphenol) monosulphide, the full nickel phenolate of o,o'-bis-(p-ethylphenol) monosulphide, the full nickel phenolate of o,o'-bis-(p-tert. amylphenol) monosulphide, the full nickel phenolate of o,o'-bis-(nonylphenol) monosulphide, the full nickel phenolate of o,o'-bis-(p-isodo-decylphenol) monosulphide, are useful as stabilizers for crystalline polypropylene. The nonyl and dodecyl groups are branched groups whose basic structure may be conceived of as derived from the trimerization of propylene and isobutylene respectively. Small quantities of ortho alkyl substituted rings and ortho-para dialkyl substituted rings are often found as impurities in the para substituted phenols from which the monosulphides are produced. The presence of such impurities has not been found to have any effect on the efficacy of the nickel phenolates, whether full or partial, ultimately obtained therefrom. Likewise, presence of meta alkyl substitution in the para-alkyl phenol nucleus may be tolerated.

There has thus been provided a stabilized crystalline polypropylene composition which is by virtue of the inclusion of from 0.05% to about 5% by weight of the stabilizer of the present invention to withstand exposure to the deleterious effects of ultraviolet light for prolonged periods without becoming unduly brittle and inflexible. A further advantage of these compositions is that the degree of coloration added to the polymer by the amounts of the stabilizers indicated is such as to preserve much of the translucency and light color of the polymer. Of course, other ingredients may be added to the compositions of the present invention such as, for example, antioxidants of the type used for heat stabilization, pigments, plasticizers, fillers, additional stabilizers against light, etc., without substantially altering the manner in which the compositions of this invention operate. Crystalline polypropylene compositions stabilized in accordance herewith are useful in the form of extruded films or fibers, and cast or molded articles. While we are not certain of the phenomenon occurring by virtue of the inclusion of the metal compounds of the present invention, it is believed that embrittlement and loss of flexibility in the untreated polyalkylenes are the result of cross-linking and increase in molecular weight of the polymer under the influence of ultraviolet light, whether from an artificial or a natural source. The metal phenolates of the present invention appear to have the ability to prevent cross-linkage in the polymer.

Other modes of applying the principle of this invention may be employed instead of those specifically set forth above, changes being made as regards the details herein disclosed, provided the elements set forth in any of the following claims, or the equivalent of such, be employed.

It is therefore, particularly pointed out and distinctly claimed as the invention:

1. A crystalline polypropylene composition containing in intimate admixture therewith from about 0.05% to about 5% by weight of a nickel phenolate of a bis-(p-alkylphenol) monosulphide in which the alkyl group contains from 2 to 12 carbon atoms, and which coacts in said crystalline polypropylene to preserve elongation and flexibility therein after exposure to ultraviolet light.

2. A crystalline polypropylene composition containing in intimate admixture therewith from about 0.05% to about 5% by weight of a full nickel phenolate of a bis-(p-alkylphenol) monosulphide in which the alkyl group contains from 2 to 12 carbon atoms, and which coacts in said crystalline polypropylene to preserve elongation and flexibility therein after exposure to ultraviolet light.

3. A crystalline polypropylene composition containing in intimate admixture therewith from about 0.05% to about 5% by weight of a nickel phenol-phenolate of a bis-(p-alkylphenol) monosulphide in which the alkyl group contains from 2 to 12 carbon atoms, and which coacts in said crystalline polypropylene to preserve elongation and flexibility therein after exposure to ultraviolet light.

4. A crystalline polypropylene composition containing in intimate admixture therewith from about 0.05% to about 5% by weight of the nickel phenol-phenolate of o,o'-bis-(p-octylphenol) monosulphide, and which coacts in said crystalline polypropylene to preserve elongation and flexibility therein after exposure to ultraviolet light.

5. A crystalline polypropylene composition containing in intimate admixture therewith from about 0.05% to about 5% by weight of the nickel phenol-phenolate of o,o'-bis-(p-nonylphenol) monosulphide, and which coacts in said crystalline polypropylene to preserve elongation and flexibility therein after exposure to ultraviolet light.

6. A light colored crystalline polypropylene composition containing in intimate admixture therewith from about 0.1% to about 1% by weight of the nickel phenol-phenolate of o,o'-bis-(p - 1,1,3,3 - tetramethylbutylphenol) monosulphide, and which coacts in said crystalline polypropylene to preserve elongation and flexibility therein after exposure to ultraviolet light.

7. The method of preserving the elongation and flexibility of a crystalline polypropylene composition after prolonged exposure to ultraviolet light which comprises intimately admixing therewith from about 0.05% to about 5% by weight of a nickel phenolate of a bis-(p-alkylphenol) monosulphide in which the alkyl group contains from 2 to 12 carbon atoms.

8. A light colored crystalline polypropylene composition containing in intimate admixture therewith from about 0.1% to about 1% by weight of the nickel phenol-phenolate of crystalline o,o'-bis-(p - 1,1,3,3 - tetramethylbutylphenol) monosulphide, and which coacts in said crystalline polypropylene to preserve elongation and flexibility therein after exposure to ultraviolet light.

References Cited in the file of this patent

UNITED STATES PATENTS 2,340,938   Daly ------------------ Feb. 8, 1944